(12) United States Patent
Bretschneider et al.

(10) Patent No.: US 10,603,646 B2
(45) Date of Patent: Mar. 31, 2020

(54) LABORATORY STIRRER

(71) Applicant: Hans Heidolph GmbH, Kelheim (DE)

(72) Inventors: Kai Bretschneider, Nürnberg (DE); Dirk Seifferth, Fürth (DE)

(73) Assignee: Hans Heidolph GmbH, Kelheim (DE)

( * ) Notice: Subject to any disclaimer, the term of this patent is extended or adjusted under 35 U.S.C. 154(b) by 566 days.

(21) Appl. No.: 14/868,789

(22) Filed: Sep. 29, 2015

(65) Prior Publication Data

US 2016/0136594 A1 May 19, 2016

(30) Foreign Application Priority Data

Nov. 14, 2014 (DE) .......................... 10 2014 116 705

(51) Int. Cl.
| | | |
|---|---|---|
| *B01F 7/00* | (2006.01) | |
| *B01F 7/16* | (2006.01) | |
| *F16D 63/00* | (2006.01) | |
| *F16D 127/06* | (2012.01) | |

(52) U.S. Cl.
CPC ................ *B01F 7/001* (2013.01); *B01F 7/16* (2013.01); *F16D 63/006* (2013.01); *F16D 2127/06* (2013.01)

(58) Field of Classification Search
CPC .......... B01F 7/001; B01F 7/16; F16D 63/006; F16D 2127/06

USPC ........................................... 366/331; 279/142
See application file for complete search history.

(56) References Cited

U.S. PATENT DOCUMENTS

| | | | |
|---|---|---|---|
| 2009/0116335 A1 | 5/2009 | Wild et al. | |
| 2013/0320635 A1* | 12/2013 | Meyers | B23B 31/201 |
| | | | 279/43 |
| 2014/0231114 A1* | 8/2014 | Schenk | B23B 45/02 |
| | | | 173/20 |
| 2014/0234015 A1* | 8/2014 | Kallas | H04R 1/083 |
| | | | 403/90 |

FOREIGN PATENT DOCUMENTS

| | | | |
|---|---|---|---|
| CN | 202028352 U | * 11/2011 | |
| DE | 2013513 A | 10/1970 | |
| EP | 2055372 A1 | 6/2009 | |
| GB | 1304585 A | 1/1973 | |
| GB | 2322271 A | * 8/1998 | ............ A47J 36/027 |

* cited by examiner

*Primary Examiner* — Walter D. Griffin
*Assistant Examiner* — Shuyi S. Liu
(74) *Attorney, Agent, or Firm* — Wiggin and Dana LLP; Gregory S. Rosenblatt; Rikesh P. Patel (57) ABSTRACT

A lab stirrer comprises a housing, a stirring shaft rotatably supported about an axis in the housing and a drive to drive the stirring shaft to make a rotary movement about the axis. A blocking device is provided to block the stirring shaft against a rotation about the shaft axis.

15 Claims, 11 Drawing Sheets

LABORATORY STIRRER

The present invention relates to a lab stirrer, in particular an overhead stirrer, comprising a housing, a stirring shaft supported rotatably about an axis and a drive to drive the stirring shaft to make a rotary movement about the axis, wherein the stirring shaft can be drive-operatively coupled to a stirring tool via a coupling device such as a chuck.

Lab stirrers are used to stir a medium located in a container. The stirring process in particular serves to achieve a uniform substance distribution. Solid substances can, for example, be dissolved in liquids or different liquids can be mixed with one another. For this purpose, a so-called overhead stirrer is frequently used in which the drive is arranged above the container and the stirring shaft with the stirring tool extends vertically downwardly.

The coupling device typically allows a change of the stirring tool to be carried out as required. The stirring shaft can in particular carry a chuck such as is known from portable drills. To remove the clamped stirring tool on a desired tool change, a user must hold a part of the chuck tight in a known manner and must rotate another part about the axis. However, the user then no longer has a hand free to hold the stirring tool. There is thus the risk that the tool will fall down, in particular with an overhead stirrer. The user also cannot simultaneously hold the stirring tool and operate the chuck on the insertion of the stirring tool. The possibility of an accidental switching on of the drive during the tool change, furthermore represents a considerable accident risk.

It is the underlying object of the invention to provide a lab stirrer of the initially named kind which is simple and comfortable to operate and which in particular allows a safe tool change.

This object is satisfied by a lab stirrer having the features of claim 1.

In accordance with the invention, a lab stirrer comprises a blocking device to block the stirring shaft against a rotation about the shaft axis.

In accordance with an embodiment of the invention, the blocking device comprises a ring element at the shaft side which is rotationally fixedly coupled to the stirring shaft and has an external toothed arrangement, a ring element at the housing side which is arranged coaxially to the ring element at the shaft side and has an internal toothed arrangement, and a guide section fixed to the housing and at which the ring element at the housing side is guided adjustably in the axial direction of the stirring shaft, wherein the ring element at the housing side is axially adjustable between a release position of the blocking device in which it is out of engagement with the ring element at the shaft side and a blocking position of the blocking device in which it is in engagement with the ring element at the shaft side.

The stirring shaft can be reliably blocked as required, in particular by the toothed engagement between the ring element at the shaft side and the ring element at the housing side. That is, a rotary movement of the stirring shaft can be stopped. It is thereby made possible that a user does not have to hold the stirring shaft or the corresponding part of the chuck tight when changing a tool. The user can actuate the rotatable component of the chuck with one hand and with the other hand can hold the stirring tool and remove or insert a new stirring tool into the chuck. The blocking device thus makes possible a particularly simple and reliable tool change.

The activation and deactivation of the blocking device can in particular take place in a simple and fast manner by an axial displacement of the ring element at the housing side. The axial movement can have a rotary movement superposed on it. The axial adjustment of the ring element at the housing side can specifically comprise a linear displacement movement. The ring element at the housing side is preferably guided by means of a slide guide at the guide section fixed to the housing. This allows a particularly simple construction.

A ring element having an external toothed arrangement or an internal toothed arrangement in the sense of the present application is not restricted to a conventional toothed wheel or to a conventional sprocket, but rather covers all ring elements which have one or more parts individually projecting outwardly or inwardly such as teeth, prongs or tines. A plurality of projecting parts of a toothed arrangement can be arranged evenly distributed or symmetrically in the peripheral direction of the respective ring element. This is, however, not absolutely necessary. A respective projecting part of the external toothed arrangement can in particular engage between two respective projecting parts of the internal toothed arrangement and vice versa. The engagement can in particular be a loose engagement such that a rotary movement of the ring element having the internal toothed arrangement relative to the ring element having the external toothed arrangement is still possible with restrictions up to an abutment of the two toothed arrangements. It is generally also possible that the external toothed arrangement and the internal toothed arrangement each only have one single part projecting outwardly or inwardly which abut one another in a relative rotary position and thus block the rotary movement of the stirring shaft.

The ring element at the housing side can have blocking teeth whose axial sides facing toward the ring element at the shaft side in the release position are chamfered or made pointed at one side. Alternatively or additionally, the ring element at the shaft side can have shaft teeth whose axial sides facing toward the ring element at the housing side in the release position are chamfered or made pointed at one side. An easy adjustment of the ring element at the housing side into the blocking position is therefore also possible with an "out-of-mesh" position of the two ring elements. In the event that both the blocking teeth and the shaft teeth are axially chamfered or made pointed, a particularly simple sliding of the teeth off one another is possible.

It is not necessary and is generally also not desired that a toothed engagement which is free or clearance or is particularly low in clearance is present between the ring element at the housing side and the ring element at the shaft side. It is rather preferred that the two ring elements are in a loose toothed engagement in the blocking position of the blocking device. The ring element at the housing side and the ring element at the shaft side can specifically have respective toothed arrangements whose distance between teeth in the peripheral direction amounts to at least twice, preferably at least three times, the tooth thickness in the peripheral direction. This is advantageous in that an "out-of-mesh" position only occurs relatively rarely. The existing rotary movement clearance is not critical with respect to a tool change since the stirring shaft can be rotated without problem by an angle of rotation of, for example, a maximum of 30° up to the abutment. Ultimately a tool change is less a question of completely inhibiting a rotary movement of the stirring shaft and more a question of stopping a rotary movement of the stirring shaft at an abutment.

The blocking device can have an actuation section axially fixedly coupled to the ring element at the housing side for the manual axial adjustment of the ring element at the housing side so that the ring element at the housing side and the actuation section can be axially adjusted together between the release position and the blocking position. Such an actuation section allows a comfortable manual operation of the blocking device. The actuation section can be configured in a specific manner for a manual operation and can in particular have radially outwardly facing gripping surfaces, e.g. grooved gripping surfaces, which can be gripped easily. Depending on the application, the actuation section can be formed in one piece with the ring element at the housing side or it can be configured as an independent component which is axially fixedly coupled to the ring element at the housing side via e.g. an entrainer device.

The actuation section can comprise a sleeve section which at least partly encompasses the ring element at the housing side and optionally the ring element at the shaft side. A complete encompassing of the ring element at the housing side and of the ring element at the shaft side is preferably provided both in the release position of the blocking device and in the blocking position of the blocking device. The toothed arrangements are thus not directly accessible from the outside, which is to be preferred for safety reasons. A specific embodiment of the invention provides that the actuation section is of a sleeve-like design overall, with the stirring shaft being led through a central leadthrough of the sleeve-like actuation section.

The actuation section can engage into the guide section fixed to the housing and can cooperate therewith such that the axial adjustment of the actuation section at the housing side from the release position into the blocking position is only possible after a rotation of the actuation section about a predefined angle of rotation from an operating position of the blocking device into the release position. The blocking device can thus be actuated like a bayonet connector.

An embodiment of the invention provides that the guide section fixed to the housing is penetrated by at least one slit of the shape of an arc of a circle in the axial direction, wherein the respective slit has a radial widened portion at one end of the arc of a circle; and provides that the actuation section has at least one prolongation extending in the direction of the release position, wherein the respective prolongation has a radial projection at its free end, with the prolongation engaging into the slit such that the radial projection engages behind the guide section fixed to the housing in the operating position and is located in the region of the radial widened portion in the release position. As soon as the radial projection is located in the radial widened portion, the prolongation can be guided in or through the slit in the axial direction so that an axial displacement of the actuation section is possible. This allows in a simple construction manner a cooperation of the guide section fixed to the housing and of the actuation section in the manner of a bayonet connector.

In accordance with a further embodiment of the invention, a switching device is provided which deactivates the drive of the stirring shaft when the actuation section is rotated from the operating position into the release position. It is thereby ensured that the stirring shaft does not run when the toothed arrangements of the ring elements are brought into engagement.

Provision can be made in this respect that the switching device comprises a switch, in particular a microswitch, arranged fixed to the housing, wherein the actuation switch has at least one prolongation which engages into the guide section fixed to the housing and which actuates or is spaced apart from a closer of the switch depending on the rotary position of the actuation section. This makes possible in a particular simple construction manner an automatic switching off of the drive before an axial adjustment of the ring element fixed to the housing. Alternatively to a switch, the automatic switching on and off of the drive could also take place by means of bridgeable contacts, reed contacts or the like.

In accordance with a further embodiment of the invention, the ring element at the housing side is axially fixedly coupled to a guide element, with the ring element at the housing side being guided adjustably in the axial direction of the stirring shaft via the guide element at the guide section fixed to the housing. In other words, the ring element at the housing side can be indirectly guided at the guide section fixed to the housing. Such a decoupling between the blocking function and the guide function can be advantageous in specific applications.

A latch device is preferably provided to latch the guide element in the release position with the guide section fixed to the housing. This prevents an unwanted independent sliding off of the assembly comprising the guide element, the ring element at the housing side and, optionally, an actuation section and thus ensures that an axial adjustment of the ring element fixed to the housing into the blocking position only takes place on an active actuation by the user.

The guide element can in particular be designed as a guide sleeve which is arranged coaxially to the ring element at the housing side. The stirring shaft can thus be led through the arrangement of ring element at the housing side and guide element in a simple technical production manner.

In accordance with a specific embodiment of the invention, the stirring shaft is connected to a free-wheeling device which releases a rotary movement of the stirring shaft in a free-wheeling direction and blocks it in a blocking direction. Such a free-wheeling device can be provided by a drive-operative coupling of one or more free-wheeling clutches with the stirring shaft. It can be advantageous with specific applications to restrict the rotation of the stirring shaft to a single predefined direction of rotation. This is the case, for example, with a lab stirrer, in particular an overhead stirrer, which has a motor having a motor shaft whose direction of rotation can be switched and which has a two-speed manual transmission having a drive shaft, wherein the drive shaft has the same direction of revolution for both gears, with a change of gear taking place by a reversal of the direction of rotation.

In accordance with a preferred embodiment of the invention, the guide section fixed to the housing defines a movement path for the guide element which is helical with respect to the shaft axis, wherein the rotary movement component of the helical movement path is directed against the blocking direction on an adjustment of the guide element in the direction of the release position. Due to the helical movement path, an axial adjustment of the guide element is always associated with a rotation of the guide element or of the ring element fixed to the housing coupled thereto. This facilitates the release of the toothed arrangement engagement in the case in which the stirring shaft is connected to a free-wheeling device. On a presence of a free-wheeling device, the mutually contacting tooth flanks of the ring elements namely tend to seize, in particular when a comparatively strong torque is exerted onto the stirring shaft during the tool change. In such a case, the friction locking present between the tooth flanks would conventionally be so pronounced that an axial pulling apart of the ring elements by hand would only be made more difficult or would not be possible at all. Since the ring element fixed to the housing is rotated against the blocking direction directly at the start of the axial adjustment in the direction of the release position, the tooth flanks release from one another, however, and allow a simple moving apart of the two ring elements.

The guide section fixed to the housing can have at least one helically extending guides slot in which a respective one guide projection arranged at the guide element is received. A plurality of helically extending guide slots and a plurality of corresponding guide projections are preferably provided which are e.g. arranged distributed with respect to a periphery of the guide element of sleeve-like design. A slot guide can be provided simply and inexpensively. A relatively weakly pronounced helical extent of the guide slot is generally sufficient to successfully counter a seizing of the teeth flanks.

A helically extending web can in particular be provided as the projection. This allows a particularly stable and reliable guidance.

A further embodiment of the invention provides that the ring element at the housing side is supported rotatably at the guide element with respect to the shaft axis, with the rotatably supported ring element at the housing side being pre-loaded in the blocking direction of the free-wheeling device by a spring device with respect to the guide element. It has namely been found that a constellation in which the tooth flanks already contact one another before the final reaching of the blocking position is problematic in the case of an existing free-wheeling device. A further axial adjustment of the ring element at the housing side is made more difficult or completely prevented in such a case by the tooth flanks pressed against one another. This circumstance is taken into account by a rotatability of the ring element at the housing side against the spring force with respect to the guide element. The tooth flanks can then slide off one another while overcoming the spring force for so long until the ring element at the housing side has reached the final blocking position.

In accordance with a further embodiment of the invention, the ring element at the housing side has a further internal toothed arrangement which is arranged axially offset from the internal toothed arrangement which can be brought into engagement with the external toothed arrangement of the ring element at the shaft side and engages into recesses formed at the guide element, with the recesses forming abutments for the further internal toothed arrangement. The rotary movement of the ring element at the housing side is restricted relative to the guide element by the abutments. This is favorable since the spring device is thus protected from a overstraining and the blocking function additionally does not depend on the effect of the spring device.

Compression springs are preferably arranged between tooth flanks of the further internal toothed arrangement of the ring element at the housing side and corresponding flanks bounding the recesses. This allows a particularly simple construction.

The ring element at the shaft side can have shaft teeth whose flanks facing away from the blocking direction are inclined in the blocking direction with respect to the shaft axis at their ends facing in the release direction and the ring element at the housing side has blocking teeth whose flanks facing in the blocking direction are inclined complementary to the flanks of the shaft teeth with respect to the shaft axis. This means that the flanks of the shaft teeth are inclined such that their ends facing in the direction of the release position are each offset in the blocking direction with respect to the ends facing in the direction of the blocking position. This generally supports a sliding into and out of one another of the ring elements. Such chamfered tooth flanks in particular facilitate a release of the toothed arrangement engagement with an existing free-wheeling device, preferably in cooperation with a helical movement path of the guide element as described above.

Display means can be provided which indicate whether the ring element at the housing side is in the release position or in the blocking position. This facilitates the operability of the lab stirrer in that a user can recognize at any time whether the stirring shaft is blocked or not.

The display means can comprise an electronic display integrated into the housing. A display anyway provided at the lab stirrer can in particular advantageously be co-used for representing the current operating state of the blocking device.

The display means can, however, also comprise a marking which identifies the position of the toothed wheel element at the housing side relative to the guide section fixed to the housing. Such a type of display can be provided particularly inexpensively.

Advantageous embodiments of the invention are also described in the dependent claims, in the further description and in the drawing.

The invention further relates to a blocking device such as is described above, with the advantageous embodiments of the lab stirrer in accordance with the invention being able to be transferred in an analog manner to the blocking device in accordance with the invention.

A non-restrictive embodiment of the invention is represented in the drawing and will be described in the following.

Figure 1A:
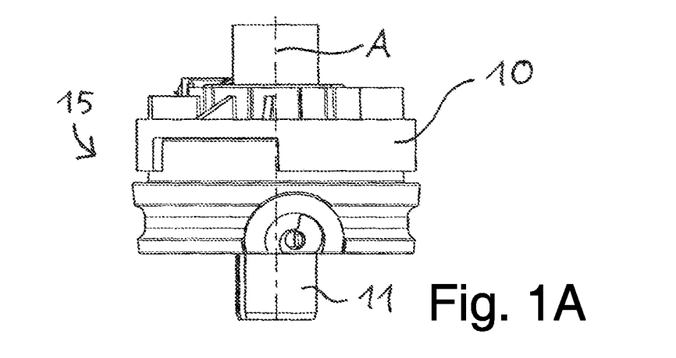
FIG. 1a shows a part of a lab stirrer in accordance with the invention with a blocking device in an operating position in a side view.
Figure 1B:
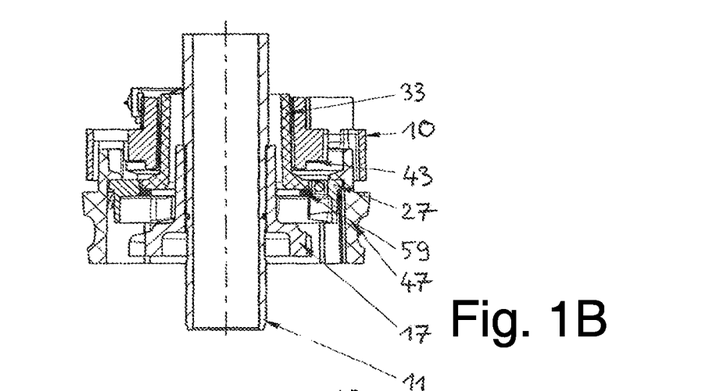
FIG. 1b shows a part of the lab stirrer in accordance with the invention with a blocking device in an operating position in a side sectional view.
Figure 1C:
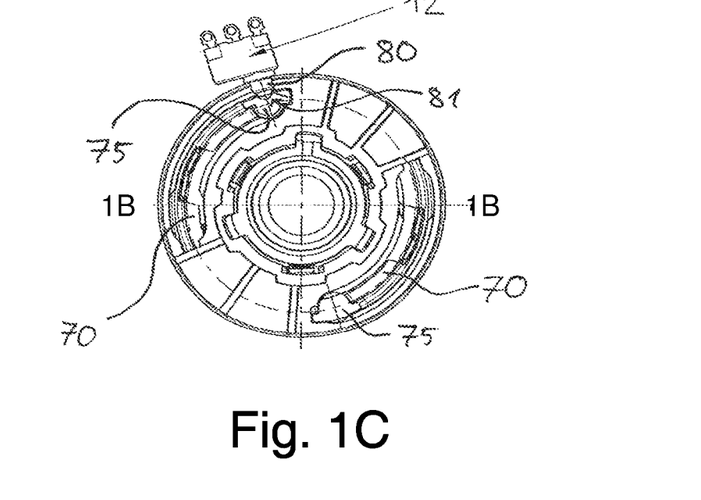
FIG. 1c shows a part of the lab stirrer in accordance with the invention with a blocking device in an operating position in a plan view.
Figure 1D:
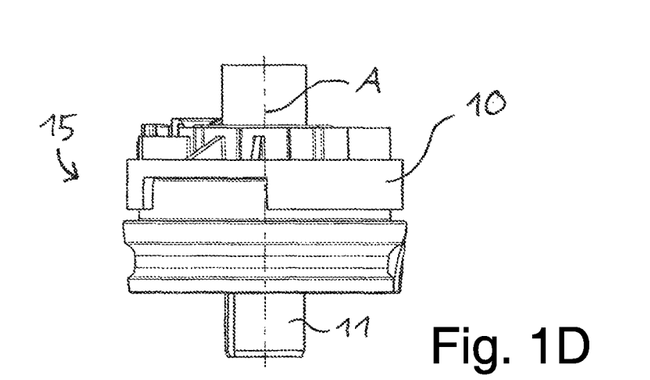
FIG. 1d shows the lab stirrer in accordance with FIGS. 1a-1c with a blocking device in a release position in a side view.
Figure 1E:
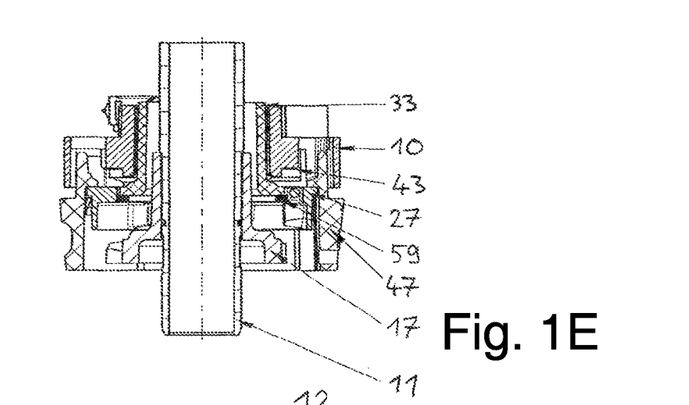
FIG. 1e shows the lab stirrer in accordance with FIGS. 1a-1c with a blocking device in a release position in a side sectional view.
Figure 1F:
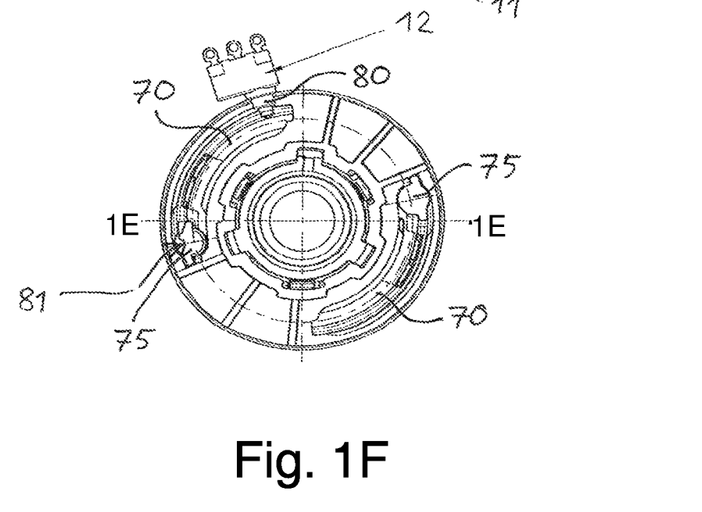
FIG. 1f shows the lab stirrer in accordance with FIGS. 1a-1c with a blocking device in a release position in a plan view.
Figure 1G:
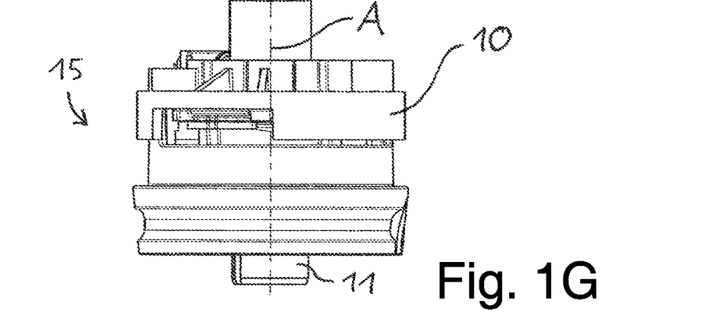
FIG. 1g shows the lab stirrer in accordance with FIGS. 1a-1c with a blocking device in a blocking position in a side view.
Figure 1H:
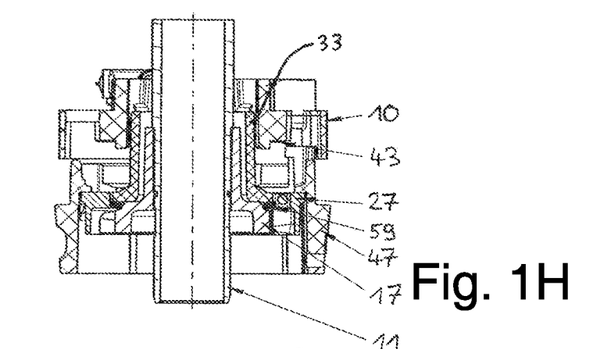
FIG. 1h shows the lab stirrer in accordance with FIGS. 1a-1c with a blocking device in a blocking position in a side sectional view.
Figure 1I:
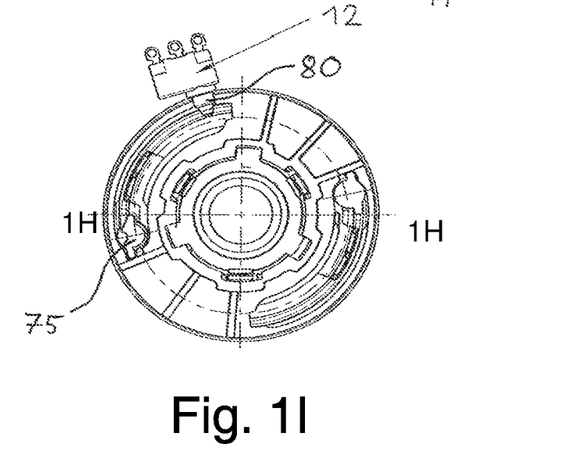
FIG. 1i shows the lab stirrer in accordance with FIGS. 1a-1c with a blocking device in a blocking position in a plan view.
Figure 2A:
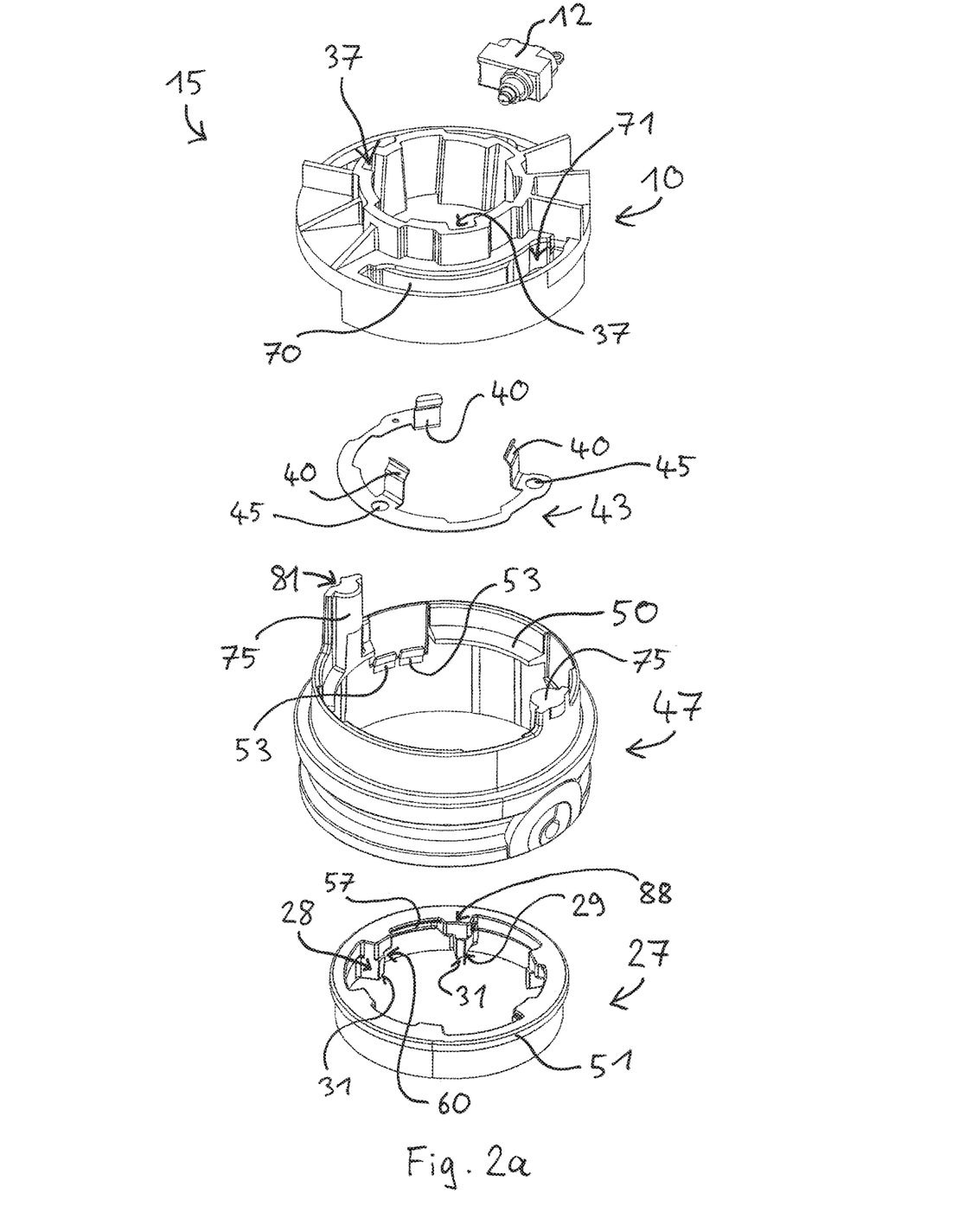
FIG. 2a is an exploded representation of a part of the arrangement shown in FIGS. 1a-1c.
Figure 2B:
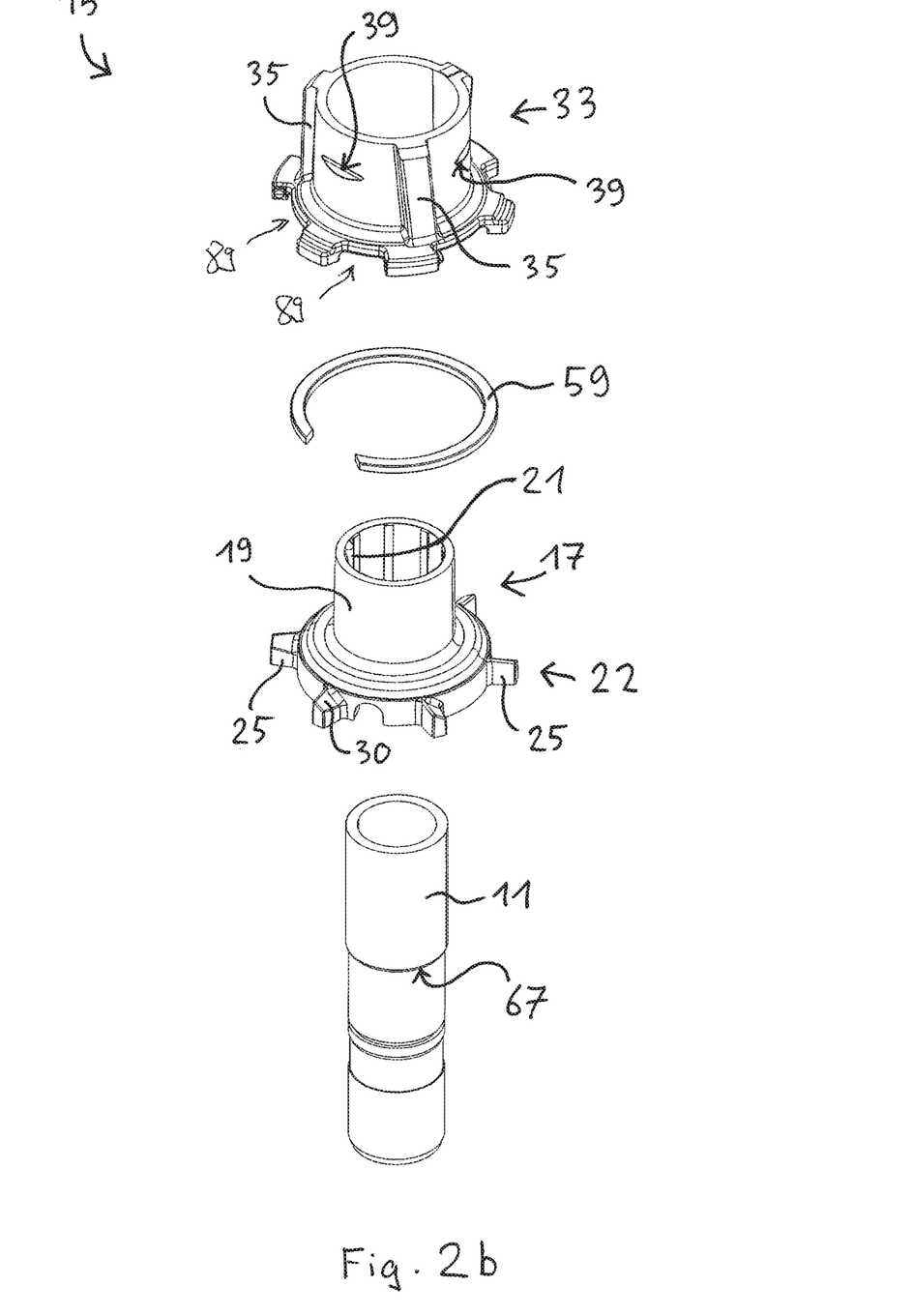
FIG. 2b is an exploded representation of the remaining part of the arrangement shown in FIGS. 1a-1c.

The arrangement shown in FIGS. 1a-1i and in FIGS. 2a and 2b forms a part of an overhead stirrer in accordance with the invention which comprises a guide section 10 formed as a part of a housing otherwise not shown, a stirring shaft 11 supported rotatably about an axis A in the housing and a drive, not shown, including a transmission arrangement. The drive, e.g. in the form of an electric motor, is accommodated in the housing 10 and serves to drive the stirring shaft 11 to make a rotary movement about the axis A. The drive can be switched on and off by means of a switch 12.

The stirring shaft 11 can be drive-operatively coupled, in a likewise known manner, to a stirring tool via a coupling device, not shown, such as a chuck. The coupling device is usually seated at the end of the stirring shaft 11 at the bottom in accordance with FIG. 2b. The coupling of a stirring tool to the stirring shaft 11 or the decoupling of a stirring tool from the stirring shaft 11 typically requires a manual rotation of a component of the coupling device while holding the stirring shaft 11 tight, optionally via another component of the coupling device.

To make the holding tight of the stirring shaft 11 dispensable on a tool change, the overhead stirrer is equipped with a blocking device 15 by means of which a user can block the stirring shaft 11 against a rotation about the axis A as required. The blocking device 15 can adopt three different states or positions which correspond to the representations of FIGS. 1a-1i. FIGS. 1a-1c correspond to an operating position of the blocking device 15 in which the drive is switched on and a rotary movement of the stirring shaft 11 is released. FIGS. 1a-1c correspond to a release position of the blocking device 15 in which the drive is switched off and a rotary movement of the stirring shaft 11 is released. FIGS. 1g-1i correspond to a blocking position of the blocking device 15 in which the drive is switched off and a rotary movement of the stirring shaft 11 is blocked.

Figure 6:
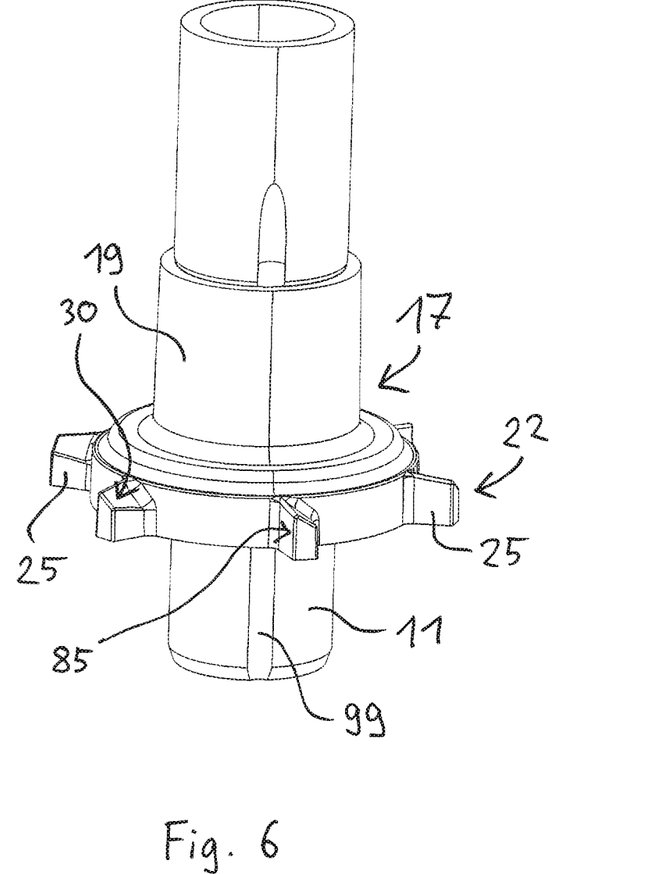
FIG. 6 is a perspective representation of a second assembly of the lab stirrer shown in FIGS. 1a-1c which comprises a stirring shaft and a ring element at the shaft side.

The blocking device 15 comprises a ring element 17 at the shaft side shown more exactly in FIG. 2b, in particular a sprocket element or toothed wheel element at the shaft side, having a sleeve-like base body 19 which is rotationally fixedly coupled via a web 21 (FIG. 7) in the form of a spline shaft to the stirring shaft 11 which is provided with a corresponding groove 99 (FIG. 6) and carries an external toothed arrangement 22 having shaft teeth 25. The blocking device 15 furthermore comprises a ring element 27 (FIG. 2a) at the housing side arranged coaxially to the ring element 17 at the shaft side, in particular a sprocket element or toothed wheel element at the housing side at which an internal toothed arrangement 28 having blocking teeth 29 is formed. As show, the upwardly facing axial sides 30 of the shaft teeth 25 in FIG. 2b are chamfered at one side. In a corresponding manner, the downwardly facing axial sides 31 of the blocking teeth 29 in FIG. 2a are chamfered at one side.

The ring element 27 at the housing side is axially fixedly coupled to a guide sleeve 33 (FIG. 2b) arranged coaxially to said ring element and is adjustably guided at the guide section 10 of the housing 10 in the axial direction with respect to the axis A. For this purpose, the guide sleeve 33 is provided with a plurality of guide webs 35 which are arranged distributed along its outer periphery, which extend helically and which are received in guide slots 37 of the guide section 10 which likewise extend helically. Latching notches 39 which are located between the guide webs 35 and into which resilient latching tongues 40 of a spring plate 43 can snap are provided at the guide sleeve 33. The spring plate 43 provided with fastening holes 45 is screwed to the lower side of the guide section 10 and serves to hold the guide sleeve 33 in a predefined axial position as required.

The blocking device 15 also comprises an actuation section 47 which is here of sleeve-like design and which is guided both rotatably and axially displaceably at the housing 10, as will be explained in more detail in the following. The actuation section 47 can be gripped and rotated or axially displaced by a user to bring the blocking device 15 into the different positions in accordance with FIGS. 1a-c.

Figure 3:
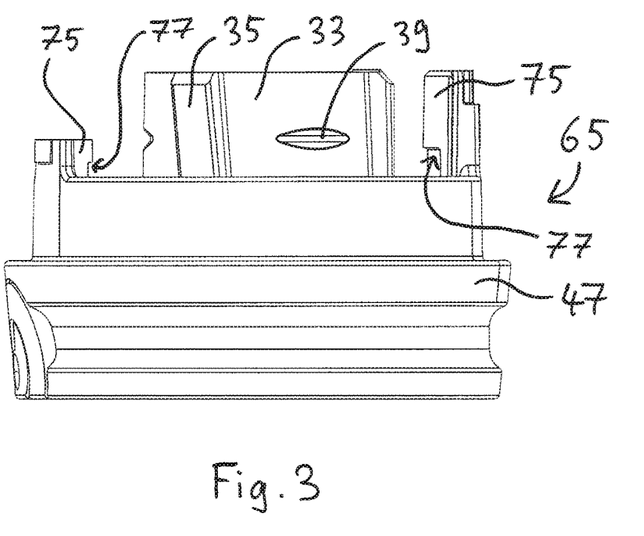
FIG. 3 is a side view of a first assembly of the lab stirrer shown in FIGS. 1a-1c.

On assembling the blocking device 15, the ring element 27 at the housing side is first introduced into the actuation section 47 from below until it abuts inwardly projecting holding webs 50 thereof. In this respect, a radially outwardly facing bead 51 of the ring element 27 at the housing side is engaged behind by snappers 53 of the actuation section 47 so that the ring element 27 at the housing side is held axially fixedly at the actuation section 47. The guide sleeve 33 is subsequently introduced from below into the actuation section 47 until it abuts inner projections 57 of the ring element 27 at the housing side. The guide sleeve 33 is then axially fixedly fastened to the ring element 27 at the housing side in that a circlip 59 is inserted between the lower side of the guide sleeve 33 and noses 60 of the ring element 27 at the housing side. The actuation section 47 of the ring element 27 at the housing side, the guide sleeve 33 and the circlip 59 then form an assembly 65 shown in FIGS. 3 and 4 which is provided as a whole for an axial adjustment with respect to the guide section 10. The assembly 10 is pushed over the stirring shaft 11 and is introduced into the guide section 10. Finally, the ring element 17 at the shaft side is set onto the stirring shaft 11, is pushed against a circumferential nose 67 thereof and is axially fixed by means of a snap ring, not shown. The ring element 17 at the shaft side fixed in this manner acts as a lower abutment for the assembly 65. The blocking device 15 is then fully assembled. It can be recognized in the sectional views of FIGS. 1a-i that the sleeve-like actuation section 47 encompasses the ring element 27 at the housing side and the ring element 17 at the shaft side in all shown positions of the blocking device 15.

Figure 4:
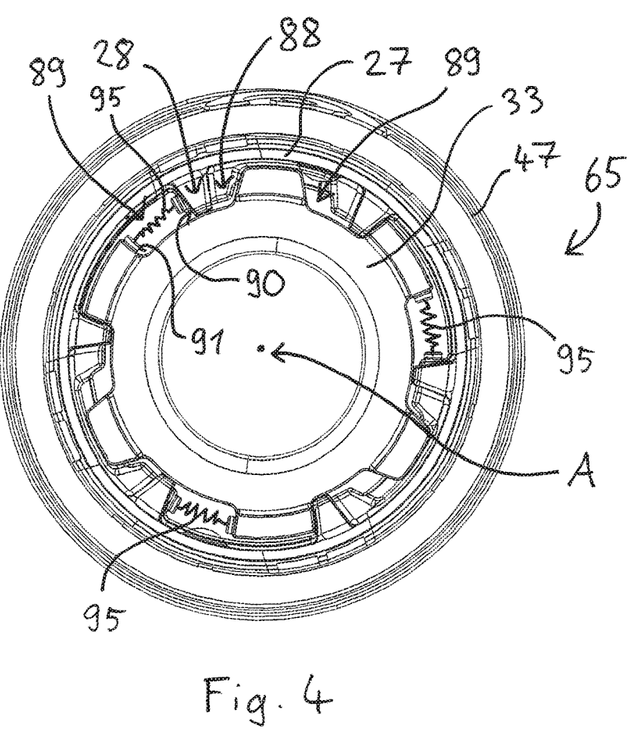
FIG. 4 is a plan view of the assembly in accordance with FIG. 3.

It must be pointed out with reference to FIGS. 2a and 2b and FIG. 4 that the ring element 27 at the housing side is rotatable about the axis A with respect to the guide sleeve 33. The ring element 27 at the housing side furthermore has a further internal toothed arrangement 88 which is arranged axially offset from the internal toothed arrangement 28 and which engages into recesses 89 formed at the guide sleeve 33. The recesses 89 in this respect form abutments for the further internal toothed arrangement 88 and thus bound the rotary movement of the ring element 27 at the housing side 27 relative to the guide sleeve 33. Compressed springs 95 which preload the ring element 27 at the housing side clockwise in accordance with FIG. 4 are arranged between the tooth flanks 90 of the further internal toothed arrangement 88 and corresponding flanks 91 bounding the recesses 89.

Figure 5:
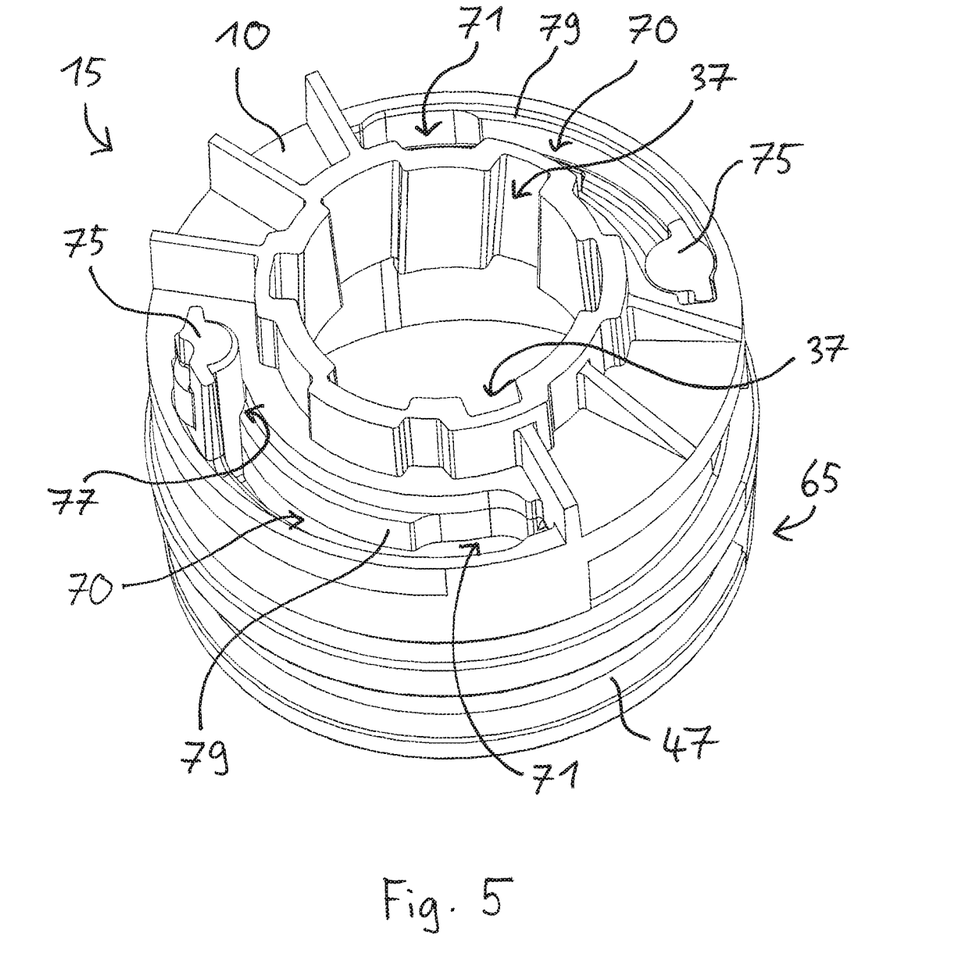
FIG. 5 is a perspective part representation of the lab stirrer shown in FIGS. 1a-1c which illustrates the cooperation between a guide section fixed to the housing and an actuation section of the blocking device.

The cooperation between the actuation section 47 and the guide section 10 will be described in the following with reference to FIG. 5. As shown, the housing 10 is penetrated in the axial direction by two mutually oppositely disposed slits 70 in the form of an arc of a circle. The slits 70 each have a radial widened portion 71 at an end of the arc of a circle. In addition, two column-like prolongations 75 project from an upper side of the actuation section 47. Each of the prolongations 75 is provided with a radial projection 77 in the region of its free end. The slits 70, the prolongations 75 and their radial projections 77 are dimensioned such that, on the one hand, the prolongations 75 can be led axially through the radial widened portions 71 and, on the other hand, the radial projections 77 engage behind respective holding ribs 79 of the housing 10 when the prolongations 75 are not located in the radial widened portions 71. This means that, starting from the operating position shown in FIG. 1a and in FIG. 5, an axial adjustment of the assembly 65 is only possible after a rotation of the actuation section 47 about an angle of rotation predefined by the slits 70. The blocking device 15 can thus be actuated in a similar manner to a bayonet connector via the actuation section 47.

It can be seen from FIGS. 1a-1f that one of the prolongations 75 actuates a closer 80 of the switch 12 in the operating position of the blocking device 15, but is spaced apart therefrom in the release position of the blocking device 15. To ensure a reliable actuation of the closer 80 in the operating position of the blocking device 15, an engagement depression 81 is formed at the respective prolongation 75. The different lengths of the prolongations 75 is purely exemplary and without any deeper significance.

The blocking teeth 29 are axially spaced apart from the shaft teeth 25 both in the operating position of the blocking device 15 and in the release position of the blocking device 15 so that no toothed arrangement engagement is present between the ring element 27 at the housing side and the ring element 17 at the shaft side. The stirring shaft 11 can consequently be rotated about the axis A in these positions.

Figure 7:
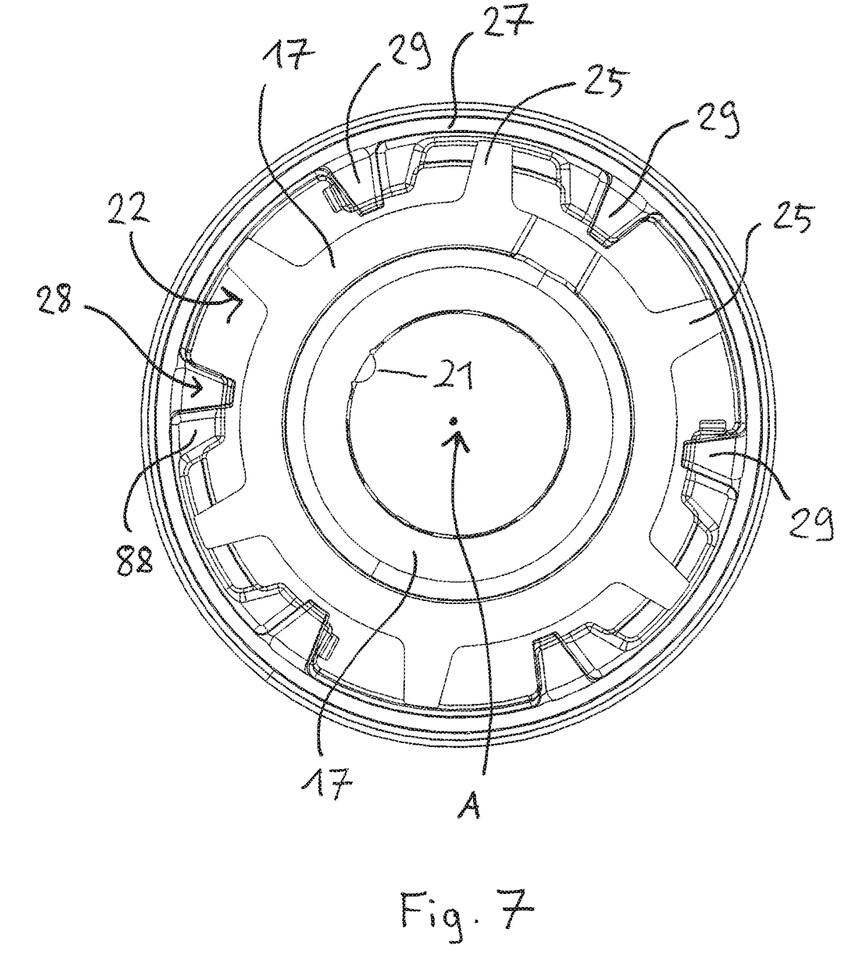
FIG. 7 shows the cooperation of the ring element at the housing side shown at the bottom of FIG. 2a and in FIG. 4 and of the ring element at the shaft side shown in a bottom view in FIG. 6.

If, starting from the operating position of the blocking device 15 shown in FIGS. 1a-1c, a user desires a blocking of the stirring shaft 11, e.g. due to a tool change to be performed, he grips the actuation section 47 and rotates it counter-clockwise in accordance with the lower part of FIGS. 1a-1c until the prolongations 75 of the actuation section 47 abut the ends of the slits 70 and the release position in accordance with FIGS. 1d-1f is reached. In this respect, one of the prolongations 75 releases the closer 80 of the switch 12 so that the drive is switched off and the stirring shaft 11 runs down. The switch 12 should switch sufficiently fast so that any continued running of the stirring shaft 11 stops before the user moves the blocking device 15 from the release position in accordance with FIGS. 1d-1f into the blocking position in accordance with FIGS. 1g-1i. This moving of the blocking device 15 into the blocking position takes place by drawing down the assembly 65 over the actuation section 47 in the axial direction while overcoming the holding force of the latching tongues 40. In the blocking position of the blocking device 15, the ring element 27 at the housing side is in toothed arrangement engagement with the ring element 17 at the shaft side so that any possible rotary movement of the stirring shaft 11 is stopped and is subsequently blocked (FIG. 7).

The stirring shaft 11 can be connected to a free-wheeling device, which is, however, not shown in the Figures. Such a free-wheeling device releases a rotary movement of the stirring shaft 11 in a free-wheeling direction, while it blocks it in the opposite blocking direction. To prevent any seizing of the blocking teeth 29 at the flank side with the shaft teeth 25 in such an embodiment, the helical guide slots 37 provide that the axial adjustment of the guide sleeve 33 and of the ring element 27 at the housing side axially coupled thereto takes place in accordance with a movement path which is helical with respect to the axis A, with the rotary movement component of the helical movement path being directed against the blocking direction of the free-wheeling device on an adjustment of the guide sleeve 33 in the direction of the release position (FIGS. 1d-1f). The blocking teeth 29 are thus immediately removed from the shaft teeth 25 when the actuation section 47 is pushed in the axial direction from the blocking position into the release position so that the toothed arrangement engagement is easy to release.

While the tooth position of the ring element 27 at the housing side is fixedly defined due to the guidance at the housing 10, the stirring shaft 11 comes to a halt in any possible rotary position in the event the drive is switched off so that the tooth position of the ring element 17 at the shaft side is undefined. There are three different possibilities how the blocking teeth 29 and the shaft teeth 25 impact one another, with these possibilities being compared in the upper. middle and lower parts of FIG. 8. The respective position of the respective teeth at the start of the engagement process is shown in solid lines, whereas the respective position of the respective teeth toward the end of the engagement process is shown, in accordance with the blocking position of the blocking device 15, in dashed lines. The free-wheeling direction of the free-wheeling device is indicated by F, while the blocking direction of the free-wheeling device is indicated by S.

Figures 8A, 8B:
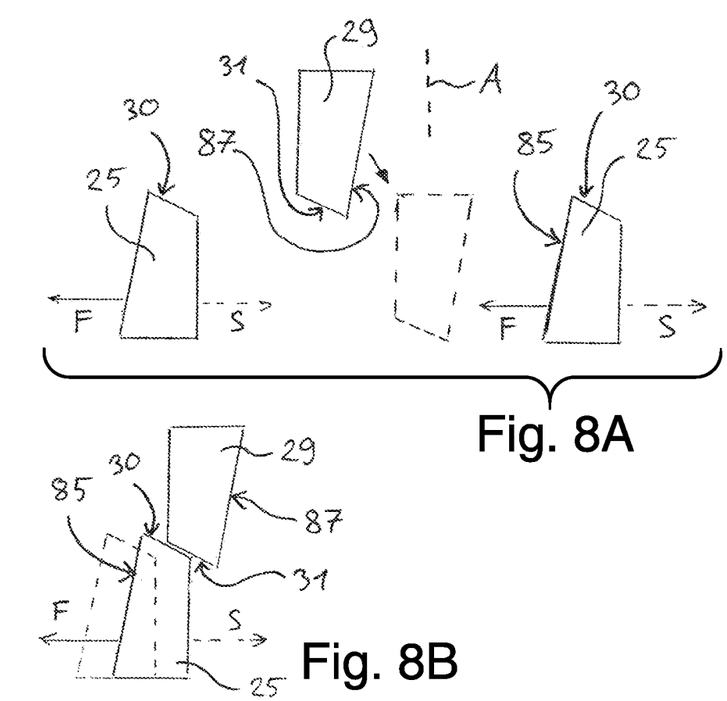
FIG. 8 shows in a schematic form three different kinds of meshing of the ring element at the housing side and the ring element at the shaft side.
Figure 8C:
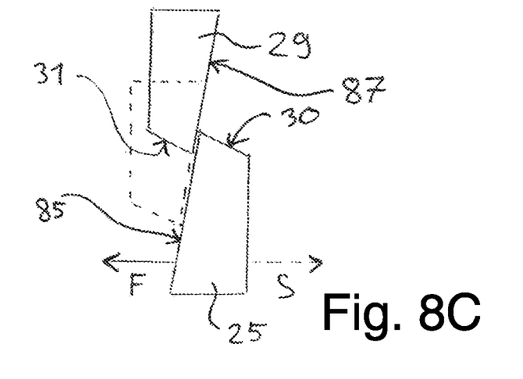

The upper part of FIG. 8 shows a constellation in which the blocking teeth 29 impact gaps between two shaft teeth 25. In this case, which will occur relatively frequently due to the large distance between teeth, the toothed arrangement engagement can take place wholly without impediment. Once the blocking position has been reached, the stirring shaft 11 can be rotated for so long manually against the blocking direction S of the free-wheeling device until the shaft teeth 25 impact the blocking teeth 29. A subsequent release of the toothed arrangement engagement is assisted, as mentioned above, by the helical movement path of the guide sleeve 33. In addition, the flanks 85 of the shaft teeth 25 facing against the blocking direction S are inclined, as shown, in the blocking direction with respect to the axis A at their upper ends, that is their ends facing in the direction of the release position. The flanks 87 of the blocking teeth 29 facing in the blocking direction S are inclined in a complementary manner hereto. This likewise assists a release of the toothed arrangement engagement.

The middle part of FIG. 8 shows an "out-of-mesh" constellation. In this case, the blocking teeth 29 and the shaft teeth 25 slide off one another due to their chamfered axial sides 30, 31, with the ring element 17 at the shaft side being rotated away with the shaft teeth 25 in the free-wheeling direction F. The stirring shaft 11 can subsequently continue to be rotated in the free-wheeling direction F until the shaft teeth 25 abut the respective next blocking tooth 29.

The lower part of FIG. 8 shows a constellation in which the flanks 87 of the blocking teeth 29 already come into contact with the flanks 85 of the shaft teeth 25 before reaching the blocking position. In this case, with an unrestrictedly rotationally fixed coupling between the guide sleeve 33 and the ring element 27 at the housing side, no further axial adjustment of the ring element 27 at the housing side would be possible due to the chamfered flanks 85, 87 and due to the helical movement path of the guide sleeve 33 since the free-wheeling device blocks. The ring element 27 at the housing side can, however, be rotated against the force of the compression springs 95 (FIG. 4) with respect to the guide sleeve 33 until the blocking position has been reached.

An easy bringing about of the toothed arrangement engagement and equally an easy release of the toothed arrangement engagement can thus take place in every possible tooth position. The invention thus allows a simple and fast blocking of the stirring shaft 11 as required, which is in particular advantageous on a tool change to be performed.

Figure 9:
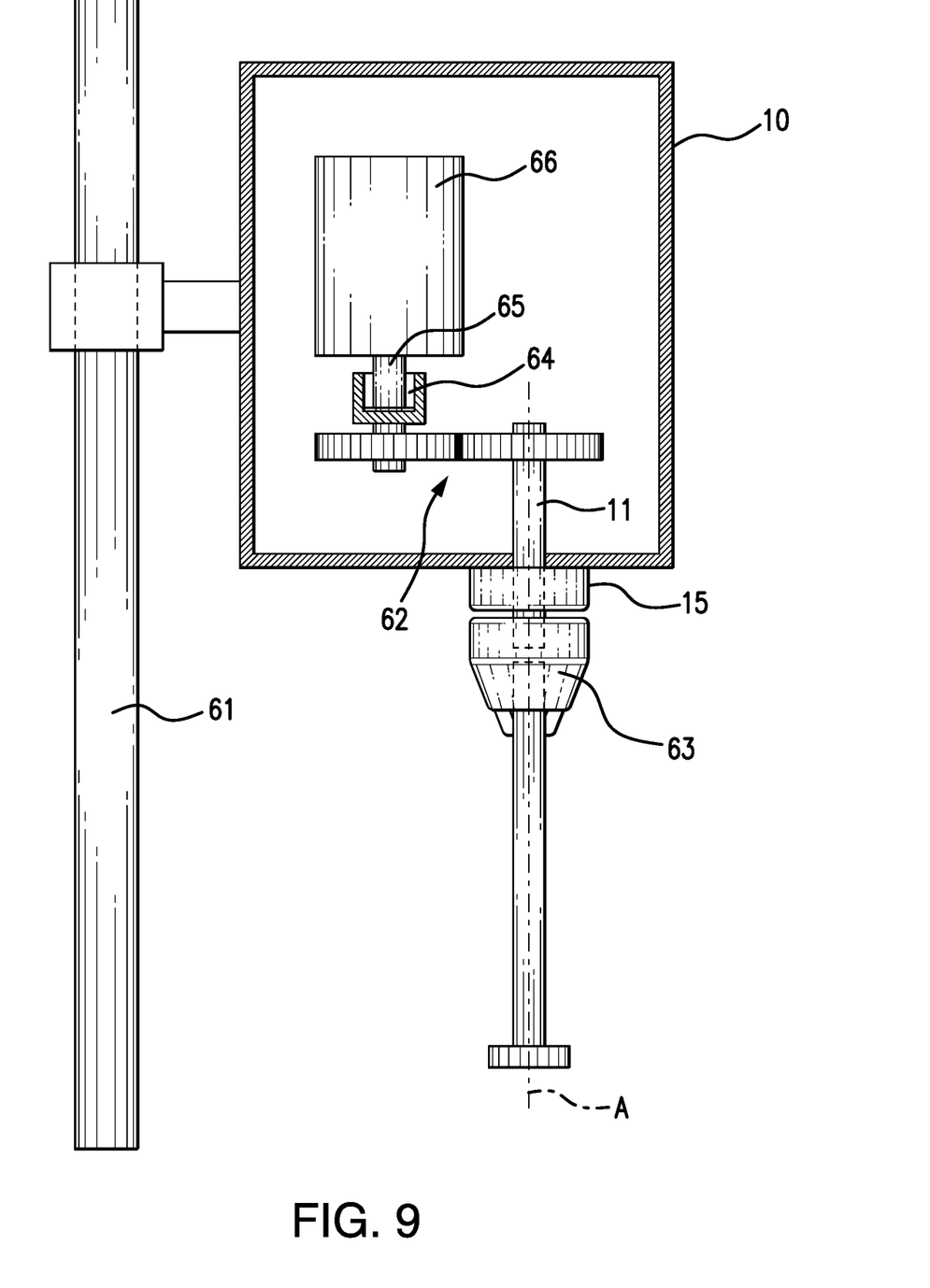
FIG. 9 shows an exemplary laboratory stirrer with a house, drive, stirring tool, and coupling device, in accordance with an embodiment.

FIG. 9 illustrates the laboratory stirrer with stand 61. Stand 61 is connected to housing 10, which includes a transmission arrangement 62. The transmission arrangement 62 is driven by the drive motor 66, via the motor shaft 65. Free-wheeling device 64 is located on the motor shaft 65. Coupling device 63 is located at the end of the stirring shaft 11.

REFERENCE NUMERAL LIST 10 guidance section fixed to the housing
11 stirring shaft
12 switch
15 blocking device
17 ring element at the shaft side
19 base body
21 web
22 external toothed arrangement
25 shaft tooth
27 ring element at the housing side
28 internal toothed arrangement
29 blocking tooth
30 axial side of the shaft tooth
31 axial side of the blocking tooth
33 guide sleeve
35 guide web
37 guide slot
39 latching notch
40 latching tongue
43 spring plate
45 fastening hole
47 actuation section
50 holding web
51 bead
53 snapper
57 inner projection
59 circlip
60 nose
65 assembly
67 circumferential nose
70 slit
71 radial extended portion
75 prolongation
77 radial projection
79 holding rib
80 closer
81 engagement depression
85 flank of a shaft tooth
87 flank of a blocking tooth
88 further internal toothed arrangement
89 recess
90 tooth flank of the further internal toothed arrangement
91 flank of the recess
95 compression spring
99 groove
A axis
F free-wheeling direction
S blocking direction

The invention claimed is:

1. A lab stirrer, comprising:
a housing;
a stirring shaft supported rotatably about a shaft axis in the housing;
a drive to drive the stirring shaft to make a rotary movement about the shaft axis; and
a blocking device,
wherein the stirring shaft can be drive-operatively coupled to a stirring tool via a coupling device, and wherein the blocking device is adapted to block the stirring shaft against a rotation about the shaft axis,
wherein the blocking device comprises a ring element at the shaft side which is rotationally fixedly coupled to the stirring shaft and has an external toothed arrangement, a ring element at the housing side which is arranged coaxially to the ring element at the shaft side and has an internal toothed arrangement, and a guide section fixed to the housing and at which the ring element at the housing side is guided adjustably in the axial direction of the stirring shaft, and wherein the ring element at the housing side is axially adjustable between a release position of the blocking device in which it is out of engagement with the ring element at the shaft side and a blocking position of the blocking device in which it is in engagement with the ring element at the shaft side,
wherein the ring element at the housing side is axially fixedly coupled to a guide element, with the ring element at the housing side being guided adjustably in the axial direction of the stirring shaft at the guide section, and
wherein the stirring shaft is connected to a free-wheeling device which releases a rotary movement of the stirring shaft in a free-wheeling direction and blocks it in a blocking direction.

2. The lab stirrer in accordance with claim 1, wherein the ring element at the housing side has blocking teeth whose axial sides facing toward the ring element at the shaft side in the release position are chamfered or made pointed at one side; and/or wherein the ring element at the shaft side has shaft teeth whose axial sides facing toward the ring element at the housing side in the release position are chamfered at one side or made pointed.

3. The lab stirrer in accordance with claim 1, wherein the ring element at the housing side and the ring element at the shaft side have respective toothed arrangements whose distance between teeth in the circumferential direction amounts to at least twice the tooth thickness in the circumferential direction.

4. The lab stirrer in accordance with claim 1, wherein the blocking device has an actuation section axially fixedly coupled to the ring element at the housing side for a manual axial adjustment of the ring element at the housing side such that the ring element at the housing side and the actuation section can be axially adjusted together between the release position and the blocking position.

5. The lab stirrer in accordance with claim 4, wherein the actuation section engages into the guide section fixed to the housing and cooperates therewith such that the axial adjustment of the actuation section at the housing side from the release position into the blocking position is only possible after a rotation of the actuation section about a predefined angle of rotation from an operating position of the blocking device into the release position.

6. The lab stirrer in accordance with claim 5, wherein the guide section fixed to the housing is penetrated by at least one slit of the shape of an arc of a circle in the axial direction, wherein the respective slit has a radial widened portion at one end of the arc of a circle, and wherein the actuation section has at least one prolongation extending in the direction of the release position, wherein the respective prolongation has a radial projection at its free end, with the prolongation engaging into the slit such that the radial projection engages behind the guide section fixed to the housing in the operating position and is located in the region of the radial widened portion in the release position.

7. The lab stirrer in accordance with claim 5, further comprising a switching device which deactivates the drive of the stirring shaft when the actuation section is rotated from the operating position into the release position.

8. The lab stirrer in accordance with claim 1, wherein the guide section fixed to the housing defines a movement path for the guide element, with the movement path being helical with respect to the shaft axis, wherein the rotary movement component of the helical movement path is directed against the blocking direction on an adjustment of the guide element in the direction of the release position.

9. The lab stirrer in accordance with claim 1, wherein the ring element at the housing side is supported rotatably at the guide element with respect to the shaft axis.

10. The lab stirrer in accordance with claim 9, wherein the ring element at the housing side has a further internal toothed arrangement which is arranged axially offset from the internal toothed arrangement which can be brought into engagement with the external toothed arrangement of the ring element at the shaft side and which engages into recesses formed at the guide element, with the recesses forming abutments for the further internal toothed arrangement.

11. The lab stirrer in accordance with claim 10, wherein compressed springs are arranged between tooth flanks of the further internal toothed arrangement of the ring element at the housing side and corresponding flanks bounding the recesses.

12. The lab stirrer in accordance with claim 1, wherein the ring element at the shaft side has shaft teeth having shaft tooth flanks, with the shaft tooth flanks facing against the blocking direction being inclined in the blocking direction with respect to the shaft axis at their ends facing in the direction of the release position, and wherein the ring element at the housing side has blocking teeth having blocking tooth flanks, with the blocking tooth flanks facing in the blocking direction being inclined with respect to the shaft axis in a complementary manner to the flanks of the shaft teeth.

13. The lab stirrer in accordance with claim 1, wherein the blocking device has an actuation section which is axially adjustable between a release position in which a rotary movement of the stirring shaft is released and a blocking position in which a rotary movement of the stirring shaft is blocked.

14. The lab stirrer in accordance with claim 13, wherein the axial adjustment of the actuation section from the release position into the blocking position is only possible after a rotation of the actuation section about a predefined angle of rotation from an operating position of the blocking device into the release position.

15. A lab stirrer, comprising:
a housing;
a stirring shaft supported rotatably about a shaft axis in the housing;
a drive to drive the stirring shaft to make a rotary movement about the shaft axis; and
a blocking device,
wherein the stirring shaft can be drive-operatively coupled to a stirring tool via a coupling device, and wherein the blocking device is adapted to block the stirring shaft against a rotation about the shaft axis,
wherein the blocking device comprises a ring element at the shaft side which is rotationally fixedly coupled to the stirring shaft and has an external toothed arrangement, a ring element at the housing side which is arranged coaxially to the ring element at the shaft side and has an internal toothed arrangement, and a guide section fixed to the housing and at which the ring element at the housing side is guided adjustably in the axial direction of the stirring shaft, and wherein the ring element at the housing side is axially adjustable between a release position of the blocking device in which it is out of engagement with the ring element at the shaft side and a blocking position of the blocking device in which it is in engagement with the ring element at the shaft side,
wherein the ring element at the housing side and the ring element at the shaft side have respective toothed arrangements whose distance between teeth in the circumferential direction amounts to at least twice the tooth thickness in the circumferential direction,
wherein an actuation section engages into the guide section fixed to the housing and cooperates therewith such that the axial adjustment of the actuation section at the housing side from the release position into the blocking position is only possible after a rotation of the actuation section about a predefined angle of rotation from an operating position of the blocking device into the release position, and
wherein the ring element at the housing side is axially fixedly coupled to a guide element, with the ring element at the housing side being guided adjustably in the axial direction of the stirring shaft at the guide section.

* * * * *